United States Patent [19]

Fehr

[11] 4,240,580
[45] Dec. 23, 1980

[54] TEMPERATURE DEPENDENT ELECTRONIC CONTROL SWITCH

[75] Inventor: Werner Fehr, Steinheim, Fed. Rep. of Germany

[73] Assignee: Süddeutsche Kühlerfabrik Julius Fr. Behr GmbH & Co. KG, Stuttgart, Fed. Rep. of Germany

[21] Appl. No.: 922,731

[22] Filed: Jul. 7, 1978

[30] Foreign Application Priority Data

Jul. 21, 1977 [DE] Fed. Rep. of Germany ....... 2732916

[51] Int. Cl.³ .............................................. F24F 7/04
[52] U.S. Cl. ...................................... 236/49; 137/82; 236/75; 251/129
[58] Field of Search ............... 236/75, 84, 49; 137/82; 251/129, 141

[56] References Cited

U.S. PATENT DOCUMENTS

| | | | |
|---|---|---|---|
| 2,474,679 | 6/1949 | Klug | 236/78 C X |
| 2,601,867 | 7/1952 | Alyea | 236/84 X |
| 2,837,104 | 6/1958 | Side | 236/84 X |
| 3,809,314 | 5/1974 | Engelke et al. | 236/49 |
| 3,822,039 | 7/1974 | Mori et al. | 236/75 |
| 3,911,354 | 10/1975 | Stanton | 236/75 X |
| 3,914,952 | 10/1975 | Barbier | 62/197 |
| 3,982,554 | 9/1976 | Saito et al. | 137/82 |
| 4,170,339 | 10/1979 | Ueda et al. | 251/129 |

Primary Examiner—William E. Tapolcai, Jr.
Attorney, Agent, or Firm—Browdy and Neimark

[57] ABSTRACT

A temperature dependent electronic control switch, especially suited for an automatic temperature control in vehicles, including one or more NTC resistors as sensors in a bridge circuit, an amplifier, to amplify the signals from the sensors, a solenoid for producing a variable magnetic field from signals received by the amplifier, an iron strip, an air nozzle connected to a vacuum, a servomotor connected between the air nozzle and the vacuum, and a control flap. The iron strip, moving in response to the magnetic field from the solenoid, obstructs an opening in the air nozzle, thereby changing the pressure felt by the servomotor and thereby causing the control flap of an air-conditioner or heater to move in a predetermined manner to mix air of different temperatures.

9 Claims, 4 Drawing Figures

TEMPERATURE DEPENDENT ELECTRONIC CONTROL SWITCH

FIELD OF THE INVENTION

The invention relates to a temperature dependent control switch for an automatic temperature control in vehicles.

BACKGROUND OF THE INVENTION

Temperature control devices with follower controls, operating with a drive motor and a feedback potentiometer are known, for example, German Utility Model 75 40 562.

Electropneumatic controls are also known, with two individually cycled solenoid valves and with pulse controllers connected in series, for example, German Offenlegungsschrift 2 126 599.

Follower controls for drive motors require a great many parts, some of which move rapidly. The service life of small electric motors poses difficulties, since the motors must operate with minimal temperature deviations as well as high rotational speeds. These drive motors must either withstand the total blocking moment, or limit switches must be provided to ensure reliable shutoff at the end positions. Furthermore, reliable starting at low temperatures cannot be ensured without an additional expenditure for special lubrication and for the bearings of rapidly moving parts. Since signals for clockwise and counterclockwise operation must be generated and amplified, the cost of electronic components is relatively high.

In known devices which are controllable by air, a controller must assume the heating and cooling functions when the cooled or considerably heated vehicle is started, and then must compensate for different outside temperatures. After the blocking state is reached, the intervention of the control is minimized. It is therefore tedious and costly to chop the analog signal at a relatively high frequency, merely to make minor corrections. Moreover, two solenoid valves are required for this purpose, which must be kept constantly in pulsed operation, and therefore are subjected to severe wear. Control systems with hot-wire transducers and quasi-constant controls with two solenoid valves are known. The hot-wire transducers have relatively long tensioned wires, which are traversed by different electric currents. This results in changes in length, which control a vacuum valve. The relatively large structural lengths which are required to accept the stretched wires as well as the long-term drift induced thereby and the exact adjustment which is necessary, are disadvantageous.

It is also known to provide a locking mechanism for a pneumatic control by means of a solenoid coil and an air nozzle. The blast is turned on or off as a function of a thermostat, through a relay. In the shutting-off process, an air nozzle is simultaneously closed, so that the actual temperature controller, operating with a bimetallic strip, is shut off, as shown in U.S. Pat. No. 3,460,754.

SUMMARY OF THE INVENTION

It is an object of the invention to provide an improved temperature-dependent electronic control switch in such a manner that a completely constant control is achieved with a minimum of mechanically actuated and electronic components.

This goal is achieved according to the invention by a control switch of the type where the electrical signals from a sensor are continuously amplified and sent to a solenoid coil, which produces a magnetic field of variable intensity. A flexible elastic soft iron strip, disposed in the vicinity of an iron core of the solenoid coil, is correspondingly attracted by the variable magnetic field in front of an air nozzle, which controls a valve element of a control flap, constantly exposing or covering the air nozzle, hence changing the air pressure in front of the air nozzle as a function of the temperature of the sensor.

It is especially advantageous if the soft iron strip is provided with a sealing surface in the vicinity of the air nozzle.

In order to prevent magnetic saturation of the iron strip, and to reduce magnetic hysteresis, it is advantageous for a nonmagnetic material with a thickness and width adjusted to the magnetic field, to be disposed between the iron core of the solenoid coil and the surface of the soft iron strip facing the iron core. In this manner, depending on the modulated voltage of the amplifier, a continuous movement of the soft iron strip will be produced which is effective at very low voltage changes.

In an advantageous manner, a synthetic or natural rubber coating is used as the nonmagnetic material, said coating being applied to the soft iron strip.

Instead of the coating, according to a modification of the invention, spacers in the form of a hard fiber pin of predetermined length can be provided, whereby the spacer is fastened either on the iron core of the solenoid coil or on the soft iron strip.

In an advantageous manner, according to another improvement in the invention, a position feedback potentiometer connected to the control flap can also be connected in series with the sensor which is designed to serve as a temperature-dependent resistance. In this manner, a proportional range, which is optional for the controlled range, is produced.

According to a preferred embodiment of the invention, a torsion-resistant housing is provided to accept the solenoid coil, the soft iron strip, and the air nozzle. A filter is advantageously provided to clean the atmospheric air on one wall of the housing.

To facilitate the setting of the desired temperature, a variable resistor is advantageously disposed at the inlet to the housing of the amplifier.

In a preferred embodiment of the invention, the housing and variable resistor are mounted directly upon a printed circuit which contains the electrical amplifier.

According to yet another feature of the invention, a throttle is located between a vacuum tank and the air nozzle.

Further advantages and details of the invention will be discussed in greater detail with reference to the drawing which shows the various embodiments in schematic form.

DETAILED DESCRIPTION OF THE PREFERRED EMBODIMENT

Figure 1:
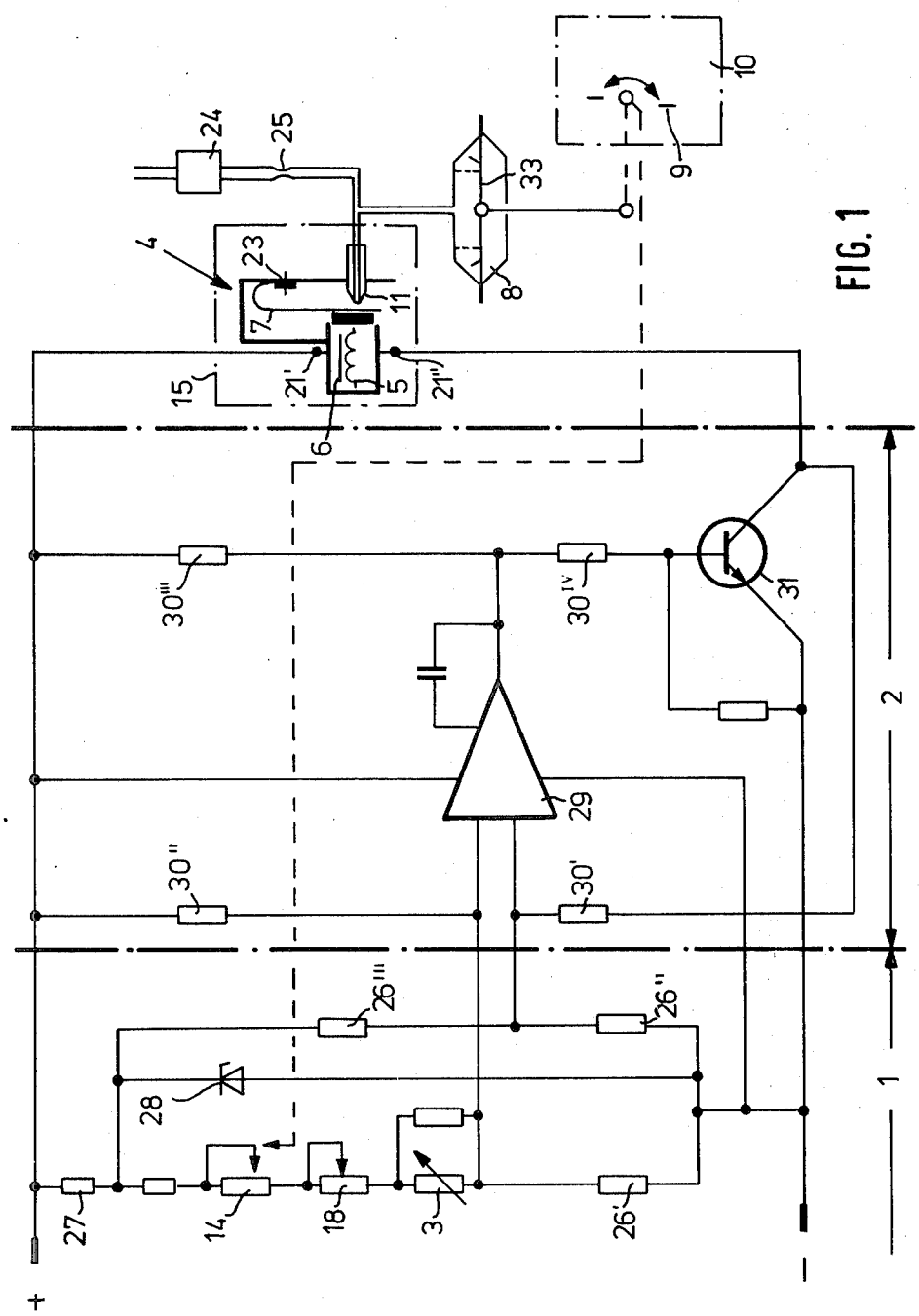
FIG. 1 is a schematic top plan view of an electronic control switch according to the invention.

A temperature-dependent electronic control switch, as shown in FIG. 1, comprises an input bridge stage 1 as well as an amplifier stage 2, a valve element 4, an adjusting element or servomotor 8, and a control flap or air flap 9. Input bridge stage 1 contains, in addition to similar bridge resistors 26', 26", and 26"', a fixed series resistor 27 and at least one sensor in the form of a temperature-dependent resistor 3, preferably a NTC resistor. A variable resistor 18 is connected in series with the temperature-dependent sensor 3, and finally a position feedback potentiometer 14 can be provided whose function will be described hereinbelow. Fixed series resistor 27 together with a diode 28 serves to stabilize the input voltage, which is preferaby a 12-volt DC current.

The output of input bridge stage 1 is connected to an operational amplifier 29 through fixed resistors 30' and 30". The output signals from the amplifier 29 are applied to a known transistorized output stage 31. The output transistor 31 then produces a continuously amplified signal voltage which is sent to a solenoid coil 5 and which is a function of the temperature of sensor resistors 3. Solenoid coil 5 is disposed in housing 15 of valve element 4 and provided with a soft iron core 6. A soft iron strip 7 is mounted in front of the soft iron core 6, the strip being adjustable by a mounting screw 23. An air nozzle 11 is disposed opposite iron core 6, said nozzle 11 being exposed to a vacuum from a vacuum tank 24 through a throttle 25. Throttle 25 can be made for example in the form of a throttle wire whose length determines the throttling effect. The function of this throttle 25 is to limit the amount of the vacuum to a degree such that when nozzle 11 is open, the pressure between servomotor 8, throttle 25 and air nozzle 11 is zero (zero corresponds to atmospheric pressure).

The vacuum line from the throttle 25 is connected in known fashion to the servomotor 8. A membrane 33 stretched therein actuates a control valve 9 in an air channel 10. A position feedback potentiometer 14 is connected mechanically to control flap 9, whereby the potentiometer 14 is advantageously disposed in the vicinity of control flap 9 and connected electrically to input stage 1.

The device according to the invention shown in FIG. 1 operates as follows.

The signals from one or more sensors 3 are amplified in electronic circuit 1 and 2 and are transformed into a proportional output voltage. This proportional output voltage is fed to solenoid coil 5. This results in different currents flowing in coil 5, which produces a magnetic force of variable strength. As explained above, soft iron strip 7 is disposed flexibly and elastically in this magnetic field, said strip 7 constantly being deflected against its pretensioning by a maximum of 0.1 mm and steadily increasing the opening of air nozzle 11 as the current increases. This causes the pressure in front of nozzle 11 to change constantly as a function of the current flowing in coil 5. The modulated air pressure is fed to pneumatic servomotor 8, whereby membrane 33 is preferably spring loaded. The differential air pressures are transformed proportionately by servomotor 8, so that the mechanically coupled air flap 9 of the heater or air conditioner of the like can assume certain positions (rotational angles) and produces mixed air of a certain temperature by mixing heated air and cooled air and supplying said air for example to a passenger compartment.

In order for the electrical hysteresis of the magnetic field and the mechanical hysteresis of all the articulation components to be eliminated, a position feedback from control flap 9 to one part of the bridge 1 is provided.

A very high electrical and pneumatic amplification of the input signal allows an extremely high response sensitivity to be achieved, whereby the inner P range is correspondingly small, while the effective P range (outer P range) is determined only by the magnitude of the feedback and the steepness of the sensor (NTC resistor 3), and the controlled range can easily be modified.

Figure 2:
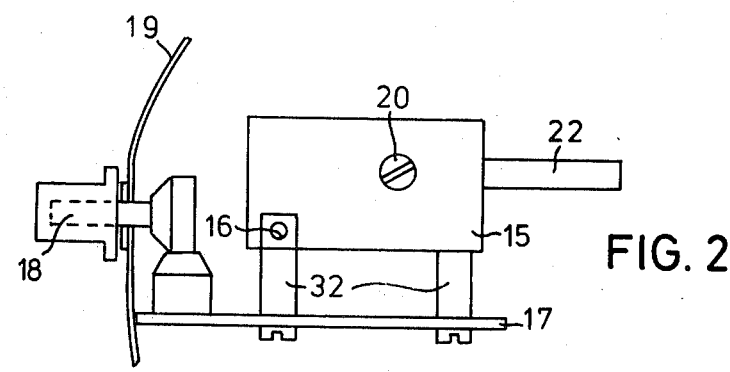
FIG. 2 is a schematic cutaway side view of the invention.

FIG. 2 is a schematic representation of the design of a control according to the invention. A housing 15 for valve element 4 is mounted on a printed circuit 17 by fastening screws 32, which contains bridge circuit 1 and amplifier circuit 2. Air nozzle 11, mounted in the housing 15, is supplied with a vacuum through a connection 22. Furthermore, solenoid coil 5, iron core 6, and soft iron strip 7 are disposed inside the housing 15. A screw 20 serves to adjust and fasten solenoid coil 5. A variable resistor 18 is disposed on printed circuit 17, said resistor 18 having its adjustment shaft projecting through a dashboard 19. Preferably, the electronic control according to the invention is disposed directly behind a dashboard or a cover, while adjustment element 8 and control flap 9 are disposed in the geometric vicinity of an air channel necessary for heating or temperature adjustment.

Figure 3:
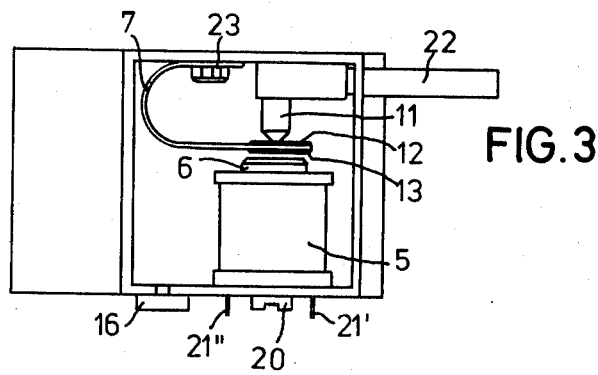
FIG. 3 shows the invention in FIG. 2 rotated through 90° and partially cut away.

It is clear from FIG. 3 that the soft iron strip 7 is mounted to the housing 15 with the aid of a fastening screw 23, whereby the distance to the iron core 6 of solenoid coil 5 is adjusted to about 0.1 mm. The soft iron strip 7 is provided with a sealing surface 12 on the side facing away from the iron core 6 of solenoid coil 5, said surface 12 being located directly opposite air nozzle 11, whereby air nozzle 11, is connected by an air pressure link 22, for example, with vacuum tank 23.

Figure 4:
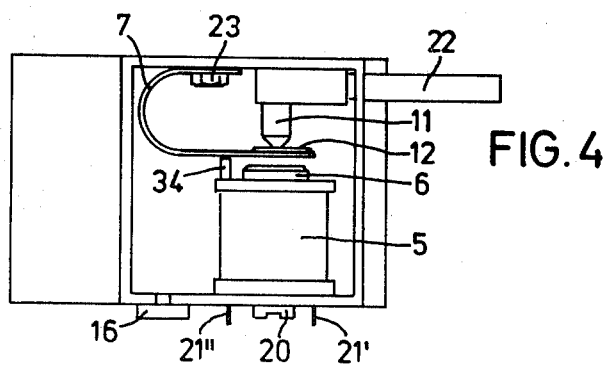
FIG. 4 shows a different embodiment from FIG. 3 in a cutaway, schematic side view.

To clean the air inside the housing 15, a filter 16 is advantageously mounted on one wall of the housing 15. This filter 16, when nozzle 11 is open, serves to filter the air which then flows into nozzle 11. In order to eliminate the possibility of direct contact between the soft iron strip 17 and the iron core 6, a nonmagnetic material 13 is provided either on iron core 6 or on soft iron strip 7. The nonmagnetic material 13 can consist of natural rubber of synthetic rubber. Instead of a coating of nonmagnetic material, a spacing pin 34 can be provided, made of hard fiber, as shown in FIG. 4.

Electrical terminals 21', 21" are provided to connect solenoid coil 5 to amplifier output 2.

The design for a control switch according to the invention makes it possible to use miniaturization techniques and to mount it directly behind dashboard 19.

It will be obvious to those skilled in the art that various changes may be made without departing from the scope of the invention and the invention is not to be considered limited to what is shown in the drawings and described in the specification.

What is claimed is:

1. A temperature-dependent electronic control switch, in particular for automatic temperature control in vehicles, having one or more temperature-dependent resistors as sensors in a bridge circuit and an amplifier for the furnishing of control signals for contionous adjustment of a valve element, wherein the electrical signals of the sensor are continuously amplified and fed to a magnetic coil and a magnetic field of variable force brought about, and wherein an iron strip disposed in the area of an iron core of the magnetic coil is correspondingly attracted by the variable magnetic field located before an air nozzle controlling an adjustment member for a control valve, continuously uncovers or covers the air nozzle, and thus continuously varies the air pressure before the air nozzle in accordance with the temperature, characterized in that the iron strip itself is embodied as an elastically yielding soft iron strip (7) and has a sealing surface (12) in the area of the air nozzle (11) and that a non-magnetic material (13) having a thickness and breadth adapted to the magnetic field is disposed between the iron core (6) of the magnetic coil (5) and the surface oriented toward the coil (5) of the soft iron strip (7).

2. A control switch in accordance with claim 1, characterized by a rubber coating applied as the non-magnetic material (13) to the soft iron strip (7).

3. A control switch in accordance with claim 1, characterized in that a position feedback potentiometer (14) connected to the adjustment element (8) or the control valve (9) is located in series with the sensor (3) embodied as a temperature-dependent resistor.

4. A control switch in accordance with claim 1, characterized in that a torsion-resistant housing (15) serves to house the magnetic coil (5), the soft iron strip (7) and the air nozzle (11).

5. A control switch in accordance with claim 4, characterized by a filter (16) disposed before one wall of the housing (15) for the purpose of cleaning the compressed air.

6. A control switch in accordance with claim 1, characterized by a set-point adjustment device (18).

7. A control switch in accordance with claim 6, characterized in that the housing (15) and the set-point adjustment device (18) are disposed directly on a printed circuit (17) containing the electrical amplifier stage (2).

8. A control switch in accordance with claim 1, characterized in that a throttle (25) is disposed between a vacuum tank (24) and the air nozzle (11).

9. A control switch in accordance with claim 1, further including a spacer comprising a hard fiber pin between said iron strip and said iron core of said solenoid to prevent hysteresis and magnetic saturation of said iron strip.

* * * * *